(12) United States Patent
Fieldman

(10) Patent No.: US 12,412,355 B1
(45) Date of Patent: Sep. 9, 2025

(54) METHOD OF RENDERING DYNAMIC LABELS IN AN EXTENDED REALITY ENVIRONMENT

(71) Applicant: VR-EDU, Inc., Gainesville, FL (US)

(72) Inventor: Ethan Fieldman, Gainesville, FL (US)

(73) Assignee: CURIOXR, INC., Gainesville, FL (US)

( * ) Notice: Subject to any disclaimer, the term of this patent is extended or adjusted under 35 U.S.C. 154(b) by 58 days.

(21) Appl. No.: 18/537,513

(22) Filed: Dec. 12, 2023

Related U.S. Application Data

(63) Continuation of application No. 18/316,108, filed on May 11, 2023, now Pat. No. 11,875,472, which is a continuation of application No. 17/986,956, filed on Nov. 15, 2022, now Pat. No. 11,688,151.

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01); *G06T 2219/004* (2013.01)

(58) Field of Classification Search
CPC .. G06T 19/006; G06T 19/20; G06T 2219/004
See application file for complete search history.

(56) References Cited

U.S. PATENT DOCUMENTS

| | | | |
|---|---|---|---|
| 10,129,524 B2 | 11/2018 | Ng et al. | |
| 11,328,155 B2 | 5/2022 | Rivers | |
| 2010/0128121 A1 | 5/2010 | Wilkinson | |
| 2011/0164163 A1* | 7/2011 | Bilbrey | H04N 21/2187 |
| | | | 348/E5.022 |
| 2012/0256956 A1 | 10/2012 | Kasahara | |
| 2013/0314441 A1 | 11/2013 | Grasset et al. | |

\* cited by examiner

*Primary Examiner* — Charles Tseng
(74) *Attorney, Agent, or Firm* — Polsinelli PC

(57) ABSTRACT

An object in 3D extended reality (XR) environment is dynamically labelled based on each respective viewpoint of a plurality of users viewing the object in the XR environment.

20 Claims, 6 Drawing Sheets

METHOD OF RENDERING DYNAMIC LABELS IN AN EXTENDED REALITY ENVIRONMENT

CROSS-REFERENCE TO RELATED APPLICATIONS

The present application is a Continuation of U.S. application Ser. No. 18/316,108, filed May 11, 2023, titled "METHOD OF RENDERING DYNAMIC LABELS IN AN EXTENDED REALITY ENVIRONMENT," which is a Continuation of U.S. application Ser. No. 17/986,956, filed Nov. 15, 2022, now U.S. Pat. No. 11,688,151 issued Jun. 27, 2023, titled, "METHOD OF RENDERING DYNAMIC LABELS IN AN EXTENDED REALITY ENVIRONMENT," the contents of which are incorporated herein by reference in their entirety.

BACKGROUND OF THE INVENTION

Extended reality (XR) environments, including virtual reality (VR) that replaces a user's environment with an immersive computer-generated virtual environment, augmented reality (AR) which supplements a user's real world view by overlaying computer-generated information, and mixed reality (MR) that provides a hybrid reality environment that merges real and virtual environments with physical and digital objects co-existing and interacting in real time, have grown more realistic and immersive as XR headsets and hardware interfaces, processor speeds, data storage and data transfer technologies have continued to improve. However, unlike conventional physical reality (i.e., real world), electronic XR environments present more opportunities for persons to learn, collaborate and share information, including in work and education fields, in ways that are not possible in the physical constraints of the real world.

One of the challenges to taking advantage of these opportunities is combining two-dimensional (2D) and three-dimensional (3D) displays of virtual objects and information to enable users to see, use, interact, store and manage collaborative activities, information, other users and the virtual objects optimally in the XR environment, such as a VR world. Another challenge to working and learning in VR environments is adapting a user's real-world physical positions and motions to provide information inputs and corresponding VR experiences and VR views in the virtual reality world, particularly when multiple users occupy a common space in VR and have different viewing angles and perspectives with respect objects displayed in the space in the virtual reality world. A variety of these XR challenges and systems and methods for solving the same are described in applicant's U.S. patent publication no. US2022/0139056 that is incorporated herein by reference.

One specific area of need for improving experiences in XR environments is better ways to display information labels three-dimensionally. As a user moves around in an XR environment, such as a user in a VR educational environment viewing a virtual object like a globe, it is often desirable for different parts (e.g., countries, cities, bodies of water, points of interest and the like) to be accompanied by text labels. However, as the user looks around and looks at the object from different distances and angles the appearance of a label or multiple labels in the XR environment are subject to sub-optimal display such as being difficult to read, impairing the view of the object or objects that are labeled, and overlapping with other labels so as to confuse the user. Particularly when multiple users are looking at the same object or objects in an XR environment, there becomes a further need for each user to have dynamic display of labels for objects in the XR environment that are personally optimized for each user's viewing and interactive experience.

SUMMARY OF THE INVENTION

Objects in XR, especially VR, have many different viewpoints that are relative to a camera. With complex learning objects such as a globe, many points of interest need to be labelled to create an effective learning experience.

Embodiments of the invention address these challenges by providing methods and systems with improved dynamic display and functionality of labels for educating users, including scholastic, tutoring, work, and other educational activities, in an XR environment, and preferably a VR environment, but also including AR and MR environments. In embodiments, methods and systems of the invention are implemented through development tools for the Meta Quest Pro platform (Oculus Platform SDK or "Oculus SDK") by Oculus VR (Irvine, CA) (parent company Meta). It will be appreciated that the systems and methods, including related displays, user interfaces, controls and functionalities, disclosed herein may be similarly implemented on other VR platforms with other VR SDKs and software development tools known to VR developers, such as Meta's Prescence Platform for development of MR environments.

In embodiments, a dynamic labelling algorithm is provided to create a system of clean, correct, and visible labels for important bits of information. An object in 3D XR environments is dynamically labelled based on the viewpoint of a main camera. Labels are preferably created based on the rotation of the object, the size of the object, and the distance of the object from the camera. Points of interest on said object that are on the opposite side or within specific thresholds are dormant and not visible. This presentation of labels creates a dynamically labelled object that can be rotated or walked around with labels of information dynamically being generated around visible points of interest.

In one embodiment, a method is provided for dynamically presenting an information label for a point of interest of an object in an extended reality environment comprising displaying an object and a first corresponding information label for the point of interest of the object to a user at a first location in the extended reality environment, and moving display of the first information label from the first location in the extended reality environment to a second location in the extended reality environment when the user changes position relative to the object, wherein the first location of the first information label is determined from a first angle between a first viewing axis of the user and a predetermined reference axis of the object and the second location of the information label is determined from a second angle between a second viewing axis of the user and a predetermined reference axis of the object.

In another embodiment, the first viewing axis is from a first camera position of the user to the center of the object and the second view axis is from a second camera position of the user to the center of the object.

In a further embodiment, the predetermined reference axis of the object is from the center of the object intersecting through a point at a chosen front of the object.

In other embodiment, the XR environment is programmed to move display of the first information label form the first location to the second location by rotating the first information label along an arc around the object that intersects the first and second locations.

In another embodiment, the same object with another second corresponding information label for the point of interest of the object is displayed to a second user in the extended reality environment such that the second corresponding information label is only visible to the second user and not the first user. In other words, each user in the same space in an XR environment sees different display positions for information labels that are specific to that user.

In one embodiment, an XR environment is programmed to display different perspective views of the same object to each of the first and second users such that a first set of a plurality of information labels corresponding to a first plurality of points of interest of the object is separately displayed to the first user based on the first user's viewing axis relative to the object and a second set of a plurality of information labels corresponding to the first plurality of points of interest of the object is separately displayed to the second user based on the second user's viewing axis relative to the object. In preferable embodiments, the second corresponding information label includes the same text as the first information label.

In another embodiment, a method is provided for dynamically presenting a plurality of information labels for corresponding points of interest of an object in an VR environment comprising displaying an object and determining a first potential label position for displaying a first corresponding information label for a first point of interest of the object to a user at a first location in the extended reality environment, displaying an object and determining a second potential label position for displaying a second corresponding information label for a second point of interest of the object to a user at the first location in the extended reality environment; replacing the first potential label position with a third label display position calculated to avoid display of the first corresponding informational label overlapping with display of the object and to avoid overlapping display of the second corresponding information label; replacing the second potential label position with a fourth label display position calculated to avoid the second corresponding information label overlapping with display of the object and to avoid overlapping display of the first corresponding information, and displaying the first corresponding information label at the third label display position and the second corresponding information label at the fourth label display position, wherein labeling lines of the first corresponding information label and second corresponding information label optionally are displayed to overlap the object.

In certain embodiments, the third and fourth label display positions are on the same plane adjacent the object. In additional embodiments, the first and second corresponding information labels include text identifying respectively the first and second points of interest of the object.

In another embodiment, the XR environment is programmed to move display of the first corresponding information label from the third display location to a fifth display location and to move display of the second corresponding information label to a sixth display location when a viewing axis of the user relative to the object changes. In such embodiments, it is preferable that the fifth display location and sixth display location do not overlap with one another. It will be appreciated that avoiding such overlap of the display locations is made through calculation of the intended positioning of the information labels and adjustment to respective positions where the information labels will be displayed without appearing to touch or overlap one another.

In some embodiments, the fifth display location and sixth display location are on the same plane.

In further embodiments, the fifth display location and sixth display location do not overlap the object subject to optional overlap of labeling lines of the information labels with the object.

DETAILED DESCRIPTION OF THE INVENTION

Figure 1:
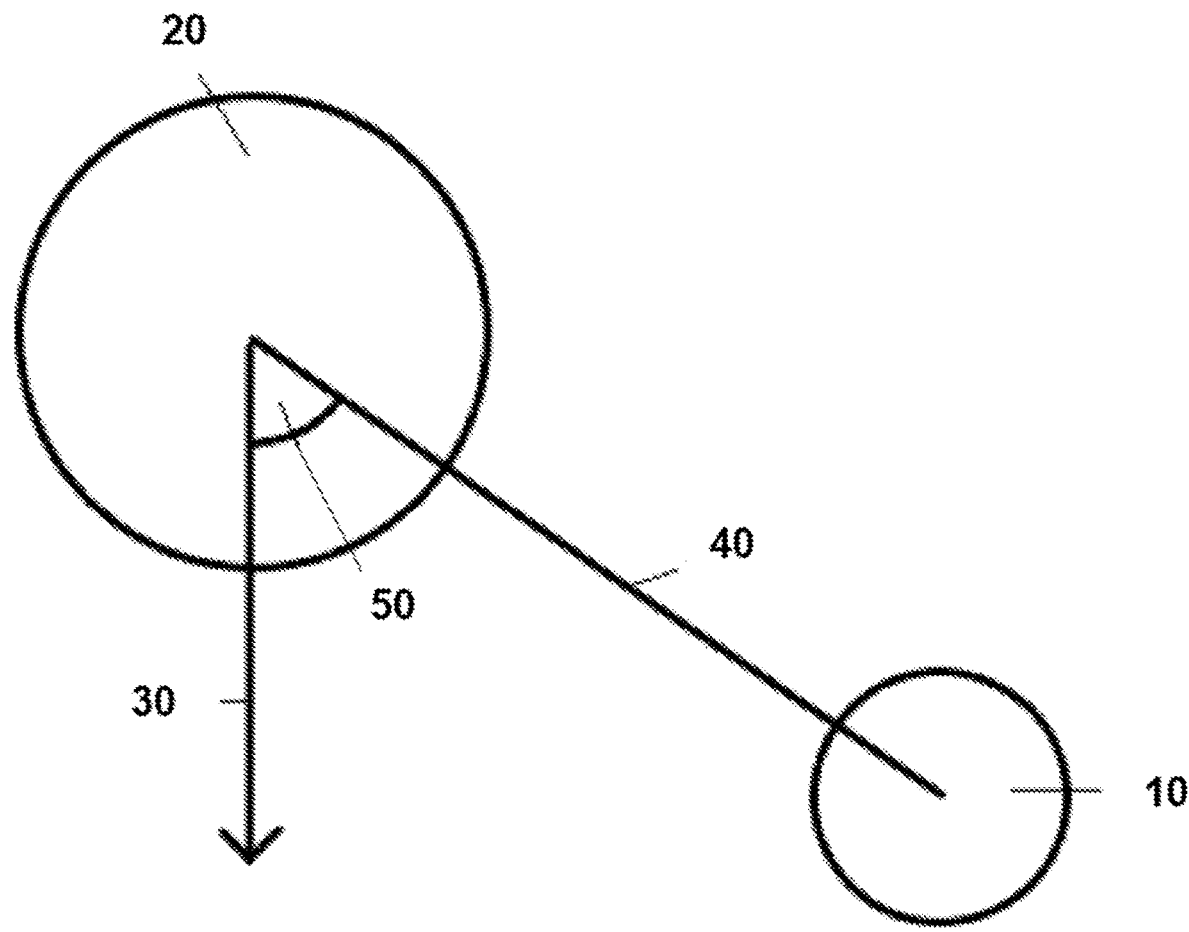
FIG. 1 is a 2-dimensional (2D) schematic illustration of locating the angle of viewpoint relative to the reference axis on an object in an XR environment in an embodiment of the present invention.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on. Devices implementing methods according to these disclosures can comprise hardware, firmware and/or software, and can take any of a variety of form factors. Typical examples of such form factors include servers, laptops, smartphones, small form factor personal computers, personal digital assistants, XR headsets, including VR headsets, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In embodiments, methods and systems of the invention are implemented through development tools for the Meta Quest Pro platform (Oculus Platform SDK or "Oculus SDK") by Oculus VR (Irvine, CA) (parent company Meta). It will be appreciated that the systems and methods, including related displays, user interfaces, controls and functionalities, disclosed herein may be similarly implemented on other VR platforms with other VR SDKs and software development tools known to VR developers, such as Meta's Prescence Platform for development of MR environments. In various described embodiments a Meta Quest Pro headset may be used in combination with application software developed for the Meta Quest Pro platform to implement inventions described herein.

As used herein, a "labeled object" is an object that is labeled with information dynamically relative to a camera's position. The information may include text, graphics, images, symbols, video, links (such as hyperlinks) and interactive controls to further information, and the like. An "area of interest" is a part of the object (subject to labeling with information) that is currently within a possible view of a camera.

Referring to FIG. 1, a method for finding an area of interest of an object 20 subject to labeling in an XR environment, such as a VR environment presented to a user wearing a VR headset such as the Meta Quest Pro running on the Meta Quest Pro platform, is illustrated in one embodiment of the invention. The direction of view a viewing axis is compared to a reference axis (e.g., a predetermined axis through the center of the object to a chosen reference point on the object—like a frontmost point of the object) to determine an angle that can be utilized to calculate where labels should be displayed that identify the points of interest on the object. The angle between the viewing axis and the camera position that defines the viewing axis to the object is used to approximate the area where labels are preferably generated dynamically for presentation in a clean and organized way to the camera position of the user.

With continuing reference to FIG. 1, a viewing axis 40 from the camera position 10 to the object 20 to be labeled is determined, such as the line in a direction from the camera position to the center of the object 20. Using a reference axis 30, such as a vector from the center of the object 20 through a predetermined point on the object—e.g., direct frontal point of the object predetermined by the programmer, the angle 50 between viewing axis 40 and reference axis 30 is calculated to approximate which area of the object 20 is preferable to be labeled. In embodiments of the invention, angle 50 may be calculated dynamically at time intervals or when the camera position 10 changes by the equation for calculating an angle between two vectors applied to the reference axis vector 30 and the viewing axis vector 40:

$$\cos^{-1}[(\text{vector of viewing axis } 40 \cdot \text{vector of reference axis } 30)/(|\text{vector of viewing axis } 40|*|\text{vector of reference axis } 30|)].$$

Figure 2:
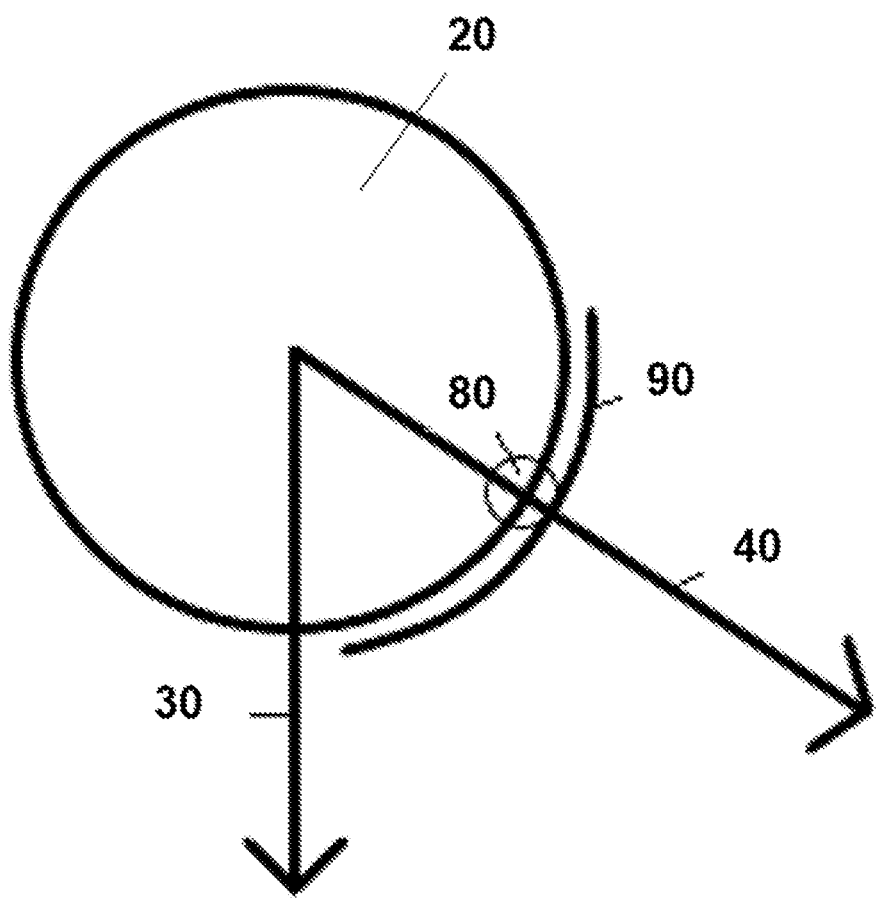
FIG. 2 is a 2D schematic illustration of finding a viewing arc to enable providing labels on an object in an XR environment in an embodiment of the present invention.

With further reference to FIG. 2, by calculating angle 50 an approximate viewing intersection point 80 on the object 20 is determined. In one embodiment, a viewing arc 90 of the object 20 is calculated from a dynamic threshold based on the size of the object 20 and where the arc 90 curves over the intersection point 80 within view from the position of the camera. Labels of information that correspond with object 20 and point 80 are displayed within that area of interest of the viewing arc 90. Specifically, by utilizing the reference axis 30 and the viewing axis 40 from the camera position 10, the viewing intersection point 80 is used to approximate an area of interest, i.e., viewing arc 90, based on dynamic values of size of the object 20 or, alternatively, based on thresholds set statically.

As an example, the front of an object 20, such as a globe, can be in any direction. The viewing axis 40 is the line from the camera position 10, player, or a reference point that intersects the center of the globe. The globe's relative rotation only factors in which area of the globe the camera is looking at. If a globe has a reference axis 30 through North America, the reference axis 30 is used to determine if the camera position 10 and the corresponding viewing axis 30 is viewing Africa, Europe, Asia, or anywhere else. If only using viewing along the reference axis 30 of the globe, only North America would be labelled.

In embodiments, labels move with the object 20 and viewing axis 40. If you have a globe and you are looking at North America and move to view Africa, then African labels (Sahara Desert, Egypt, and the like) a preferably displayed. If there are labels that don't pin to a specific point or have a larger area (e.g., Northern Hemisphere, latitude and longitude lines), then they move in embodiments with the viewing axis 40 and the calculated viewing arc 90. The viewing arc 90 moves based on where the camera position 10, player, or a reference point is located around the object 20.

Figure 3:
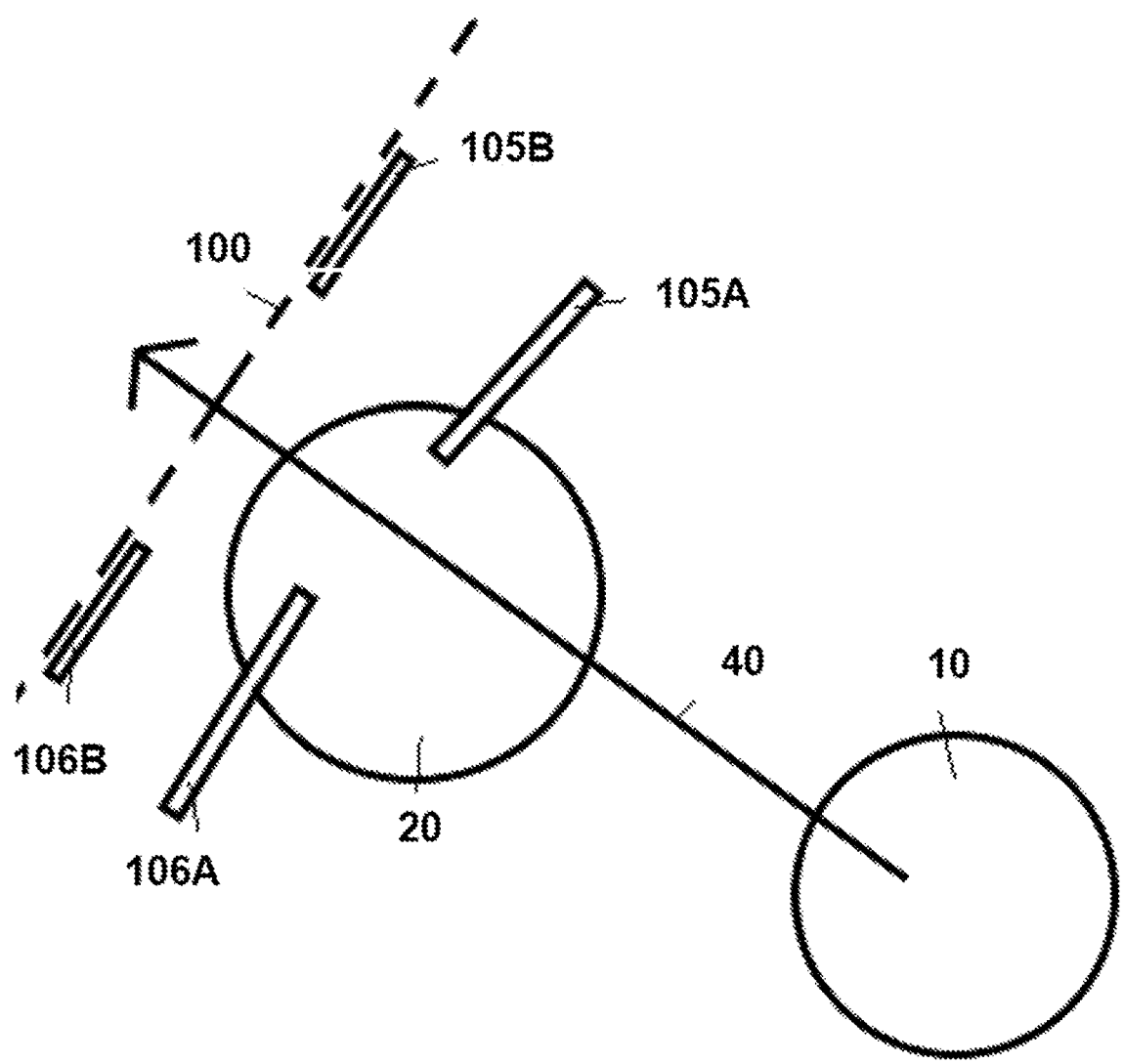
FIG. 3 is a 2D schematic illustration of projecting a plane perpendicular to the viewing axis to create a plane on to which different labels are projected and adjusted in position on the plane to avoid unwanted overlap of the labels with one another and impeding viewing of object subject to labeling in an XR environment in an embodiment of the present invention.

Referring to FIG. 3, generating labels dynamically can create situations of overlap between labels and/or labels over the object that cause confusion and difficulty in interpreting the information. Avoiding such overlap or confusing placement of labels with respect to the object and other labels can be remedied by calculating the approximate view angle to project the labels onto a perpendicular plane and checking for rough overlapping. The labels can then be offset until there is no overlapping from the relative location of the camera 10.

As shown in FIG. 3, from the camera position 10 a viewing axis 40 is created through the labeled object 20. From viewing axis 40, a perpendicular plane 100 is determined. Prospective labels 105A and 106A are projected onto the plane 100 as updated labels 105B and 106B, and the position of the projected labels 105B and 106B are checked for collision or overlap and moved accordingly so that the labels 105B and 106B avoid confusing placement.

With continuing reference to FIGS. 1-3, the area of interest for an object 20 subject to labeling is calculated dynamically and overlap of the labels is avoided to dynamically generate a labeled object 20. This object 20 is labeled so that, based on the viewpoint of the camera position 10, different labels appear on a specific part of the viewed object 20. It will be appreciated that the labeled objects 20 can be utilized for multiple purposes such as education, marketing, business, entertainment, and other activities where a user can benefit from information labels associated with an object and parts of the object in an XR environment. As further detailed, each user interacting with an object 20 also preferably has their own dynamic and personal view of the labels associated with object 20.

Figure 4A:
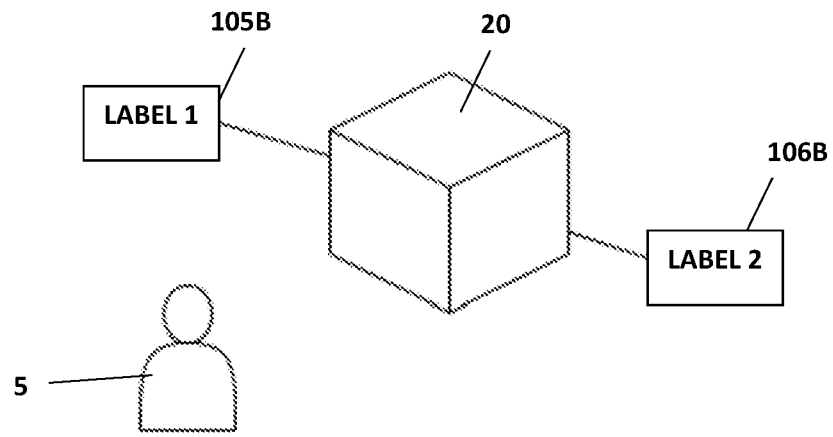
FIG. 4A is a 2D schematic illustration of a user at a first position with labels dynamically positioned and organized for identifying points of an object to the user in an XR environment in an embodiment of the present invention.
Figure 4B:
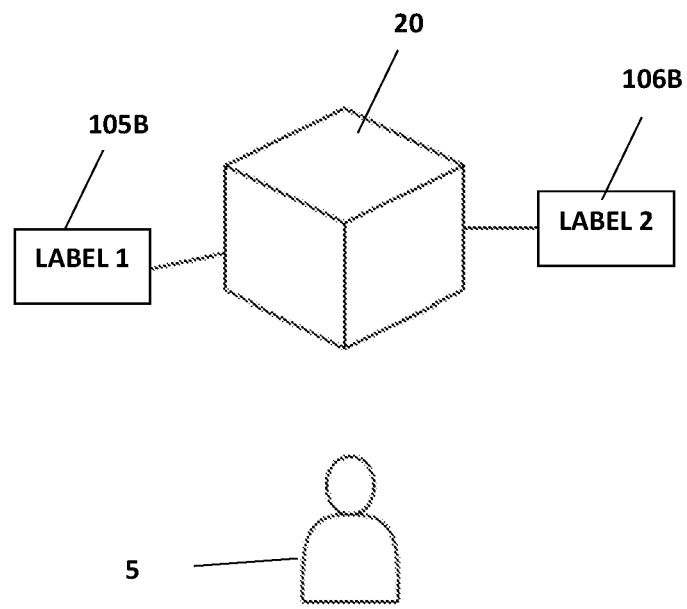
FIG. 4B is a 2D schematic illustration of a user having moved to a second position from the fist position shown in FIG. with labels dynamically moving to a provide a better view of the labels identifying the same for points of an object the user in an XR environment in an embodiment of the present invention.

With further reference to FIGS. 4A and 4B, when a user 5 changes position with respect to viewing an object 20, the position of a first label 105B and second label 106B also change to provide the user with preferred, organized view. The labels and 105B and 106B each continue to identify their same respective point of interest of the object 20; however, as the user 5 changes position the labels also change position for preferential lines of viewing for the user 5 to each label while both labels remain visible to the user 5. In some embodiment of the invention, the labels 105B and 106B rotate with a user 5 moving around the object, such rotating on an imaginary sphere or arc around the object 20 to dynamically provide a preferred, organized display of multiple labels to the user. As previously described, the application software displaying the labels continually calculates the preferred positioning of the labels to avoid overlap with other labels and to avoid impeding a user's view of the object (and points of interest on the object). In embodiments, the labels are not merely rotated clockwise or counterclockwise around the object, but also may move up or down to accommodate the height of the user viewing the object and labels and/or the angle or perspective of the user's line of sight to the object and labels.

Accordingly, the height of the user, distance of the user from the object, size of the object, location of points of interest that are labeled on the object, the reference axis for the object, the viewing axis and angle relative to the reference axis are preferably included in a predetermined algorithm to dynamically determine the preferred spatial display of each label in an XR environment for each user viewing an object. Those skilled in the art will appreciate that a predetermined algorithm will depend on the type of XR environment, object and number of points of interest with respective labels, hardware device (e.g., type of XR headset or other interactive 3D viewing device used by a user), preferred label sizes and purpose, and similar variables that affect the quality of display of objects and labels (particularly text with display characteristics dependent on font type and size).

Figure 5:
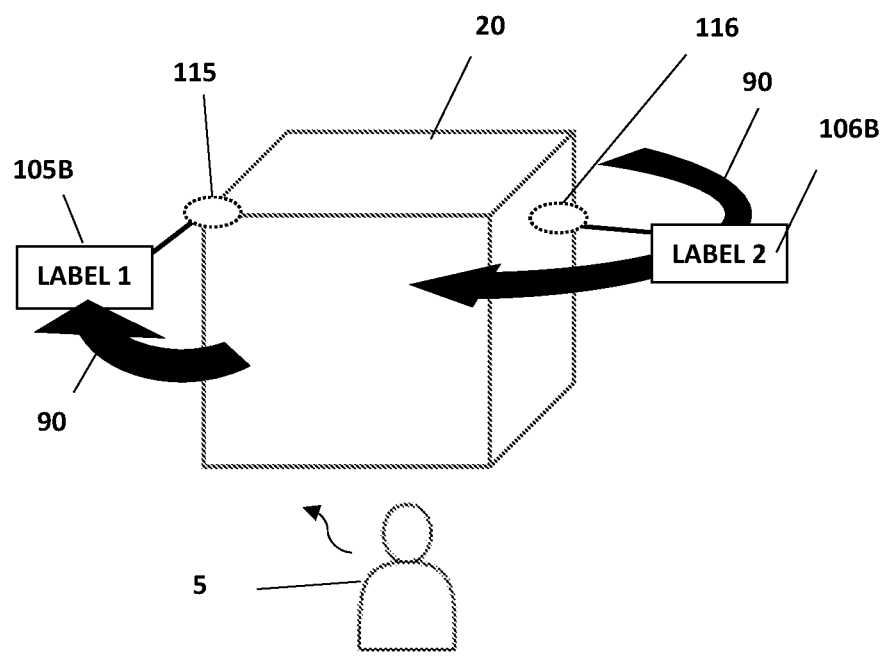
FIG. 5 is 2D schematic illustration showing how labels dynamically move along an arc for organized display relative to a user based on the user's position and view of the object in an XR environment in an embodiment of the present invention.

Referring to FIG. 5 in one embodiment of the invention, the dynamic movement of a first label 105B and second label 106B is shown relative to a user 5 moving clockwise around an object 20. The first label 105B provides information about an associated fist point of interest 115 on the object 20 while a second label 106B provides information about a second point of interest 116 on the object 20. As the user 5 moves in the virtual reality environment around the object 20 in a clockwise direction, the positions of the labels 105B and 106B preferably move clockwise based on the calculated viewing arc 90 for each label with respect to the user 5 at a camera position 10.

Alternative methods for dynamic display of labels similar to shown in FIG. 5 can be implemented for an object 20 that might be rotated, such as a world globe in a VR environment, instead of the user 5 moving around the object 20. In embodiments where the object 20 is rotated, the viewing axis 40 of the user with respect to a reference axis 30 of the object 20 is determined for each position when the object is rotated, such as continuous monitoring or at predetermined time intervals, and the labels are dynamically displayed to the user.

It will be appreciated as shown in FIGS. 4A, 4B and 5 that information labels preferably include a labeling line from the text (or other information display of the label) to the corresponding point of interest of the object being labeled. When multiple users are each viewing their own respective label or set of labels in an XR environment, each user will not only see only the display of their label set but also the labeling lines are individually displayed for each viewer's point of view. In some embodiment a labels and labeling line may be combined like a flag with a text on the flag portion and the pole portion extending as the labeling line to the point of interest. It will be appreciated that balloons (such as with a string as a labeling line to the point of interest and the balloon portion including text), captions, and other like design elements may be implemented to provide an information label with a labeling line.

Figure 6:
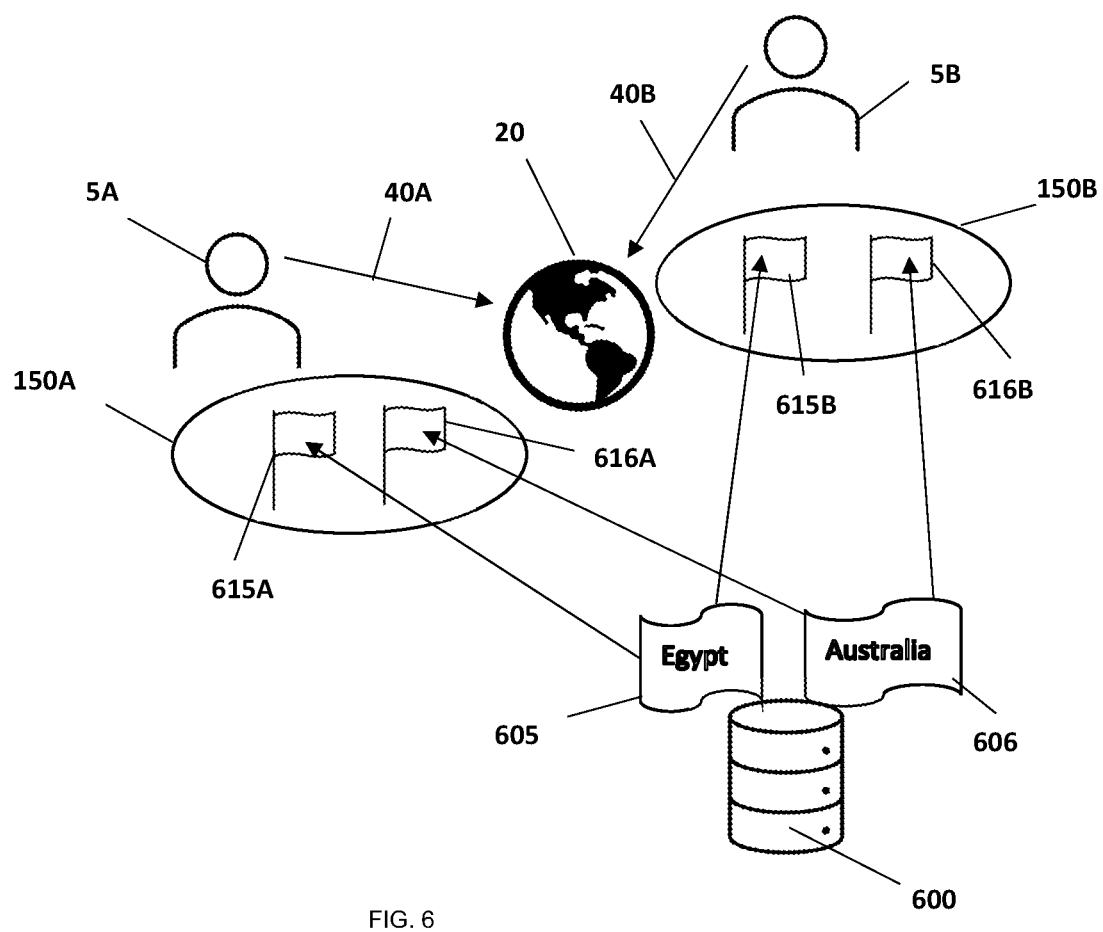
FIG. 6 is a 2D schematic illustration showing multiple information label sets for corresponding points of interest for an object separately presented to different users viewing that same object in an XR environment in an embodiment of the present invention.

Unlike other typical viewing experiences in XR, it is advantageous for each user to see dynamic labels that are optimized for each individual user's viewing angle with respect to the object 20. FIG. 6 schematically illustrates an embodiment of the invention with two users in an XR environment viewing the same object with the same information for points of interest on the object but with different sets of labels displayed to each user. Each user 5A and 5B, while simultaneously viewing the same object 20 (such as a globe) in an XR platform space along their respective viewing axis 40A and 40B from their respective camera position, sees their own set of labels 150A and 150B individualized for display to the respective user based on that user's position relative to the common object 20 that both are viewing in an XR environment simultaneously. Each user will not see the customized views of labels for other users—only their determined view of labels. Such individualized display of labels is distinguished from displaying the same object from different viewpoints of different users in a shared or co-located XR environment. Instead of users seeing the same object from different points of view as shown in FIG. 6, each user sees different set of labels 150A and 150B displayed to them individually and not the same label from each user's point of view. As shown in FIG. 6, the information from database 600 that is part of the application software on each user's XR display device (e.g., VR headset), such as text of Egypt for information data 605 and Australia for information 606 is the same information data for respective points of interest that are included in both users' label sets 105A and 105B. However, the same first text information (Egypt) 605 will be shown in different labels and display positions to each respective user—namely in label 615A to first user 5A and in label 615B to user 5B. Similarly, the same second text information (Australia) 606 will be shown in different label display positions to each respective user—namely in label 616A to first user 5A and in label 616B to user 5B. Populating each viewer's own display with their own set of labels 150A and 150B for an object 20 allows each user 5A and 5B to have a well-organized view of labeling for points of interest on the object 20 even where the users are otherwise seeing the same object 20 based on their position and viewing perspective of that object. Further, the labels that are displayed for each user's viewing experience preferably move with the user so that the labels are presented dynamically when each user moves around an object 20 and changes that user's viewing angle. The database 600 allows information common to each user's experience, such as the label information corresponding to the same points of interest, to be stored and shared to each user's set of labels 150A and 150B, but with different placement of the information label positions for each user while the information itself, e.g., text, graphics, hyperlink or similar linked information, media and the like, is the same on each user's labels.

More specifically, if first user 5A and second user 5B are in the same room in an XR environment and both looking at globe object 20 that include labels, first user 5A will never see labels 615A and 616A shown to first user 5A exactly the same way second user 5B sees the labels 615B and 616B shown to the second user 5B. The respective label sets 150A and 150B shown to each user will include the same text on the labels in each set, but for each user the labels 615A, 616A, 615B and 6156B will be shown in an optimized manner according to each user's viewing angle calculated with the respect to the object 20 and the resulting viewing arc for each user to preferably see the text of their respective label.

Another example would be a pyramid being viewed by both a user 1 and user 2 at different respective angles, but while user 1 and user 2 are both co-located in a common XR environment. If user 1 and user 2 each are looking at the pyramid, it would be disadvantageous for the entire pyramid to rotate independently for each user. If that happened then when user 1 points to a corner of the pyramid, user 1's finger might be pointing to a side instead of the intended corner from the view of user 2 who is seeing the pyramid rotated and displayed different from user 1. As a result, the pyramid object should preferably remain in fixed position so that points of interest on the object remain constant in the view of multiple users that are interacting with that object and each other. But with labels that are dynamically displayed to each user, if user 1 points to a label, user 2 sees the same label just having the letters rotated to a preferable viewing angle for better by user 2.

It will also be appreciated that some users in common XR environments are taller than others. In embodiments of the invention, either automatically based on the height of a user or by controls made available to user, the height of dynamic labels can also be adjusted. Accordingly, labels and the text thereon not only adjust left and right according to a user's viewing arc, but the labels can also move up and down to appear at a preferable height to a respective user. In certain embodiments, user can also optionally adjust, such as by XR control inputs or automatic adjustment sensed from movement of a user's head or eyes (including as in a VR headset with position tracking of head and/or eyes), the pitch and yaw and roll of each dynamic label.

Various embodiments of the invention have been described. It will, however, be evident that various modifications and changes may be made thereto, and additional embodiments may be implemented, without departing from the broader scope of the invention as set forth in this disclosure. This specification is to be regarded in an illustrative rather than a restrictive sense.

What is claimed is:

1. A method for dynamically presenting respective information labels for a point of interest of an object to a plurality of users in a common extended reality environment comprising:
   simultaneously displaying the object to a first user with a first extended reality display device and to a second user with a second extended reality display device wherein the first user and second user are viewing the common extended reality environment,
   displaying a first information label corresponding to the point of interest of the object to the first user based on the first user's viewing angle of the object in the common extended reality environment;
   displaying a second information label corresponding to the point of interest of the object to the second user based on the second user's viewing angle of the object in the common extended reality environment; and
   wherein the first information label is displayed to the first user without being displayed to the second user and wherein the second information label is displayed to the second user without being displayed to the first user.

2. The method of claim 1, wherein the first information label is repositioned when the first user's viewing angle of the object changes.

3. The method of claim 2, wherein the second information label is repositioned when the second user's viewing angle of the object changes.

4. The method of claim 3, wherein the first information label and the second information label include a same text identifying the point of interest.

5. The method of claim 3, wherein the first information label and the second information label include same information displayed on each label.

6. The method of claim 2, wherein the first information label and the second information label include a same text identifying the point of interest.

7. The method of claim 2, wherein the first information label and the second information label include same information displayed on each label.

8. The method of claim 1, wherein the first information label and the second information label include a same text identifying the point of interest.

9. The method of claim 1, wherein the first information label and the second information label include same information displayed on each label.

10. The method of claim 1, wherein the first information label is displayed based on a height of the first user and wherein the second information label is displayed based on a height of the second user.

11. A method for dynamically presenting respective sets of information labels for points of interests of an object to a plurality of users in a common extended reality environment comprising:
    simultaneously displaying the object to a first user with a first extended reality display device and to a second user with a second extended reality display device wherein the first user and second user are viewing the common extended reality environment;

displaying a first set of information labels corresponding to the points of interest of the object to the first user based on the first user's viewing angle of the object in the common extended reality environment;

displaying a second set information labels corresponding to the points of interest of the object to the second user based on the second user's viewing angle of the object in the common extended reality environment; and wherein the first set of information labels is displayed to the first user without being displayed to the second user and wherein the second set of information labels is displayed to the second user without being displayed to the first user.

12. The method of claim 11, wherein the first set of information labels are repositioned when the first user's viewing angle of the object changes.

13. The method of claim 12, wherein the second set of information labels are repositioned when the second user's viewing angle of the object changes.

14. The method of claim 13, wherein a first label of the first set of information labels and a second label of the second set of information labels each include a same text identifying a same point of interest.

15. The method of claim 13, wherein a first label of the first set of information labels and a second label of the second set of information labels each include a same displayed information identifying a same point of interest.

16. The method of claim 12, wherein a first label of the first set of information labels and a second label of the second set of information labels each include a same text identifying a same point of interest.

17. The method of claim 12, wherein a first label of the first set of information labels and a second label of the second set of information labels each include a same displayed information identifying a same point of interest.

18. The method of claim 11, wherein a first label of the first set of information labels and a second label of the second set of information labels each include a same text identifying a same point of interest.

19. The method of claim 11, wherein a first label of the first set of information labels and a second label of the second set of information labels each include a same displayed information identifying a same point of interest.

20. The method of claim 11, wherein the first set of information labels is displayed based on a height of the first user and wherein the second set of information labels is displayed based on a height of the second user.

* * * * *